Nov. 10, 1964    R. O. WINTHER    3,156,838
DIRECT CURRENT ELECTRIC MOTOR
Filed Sept. 4, 1959    2 Sheets-Sheet 2
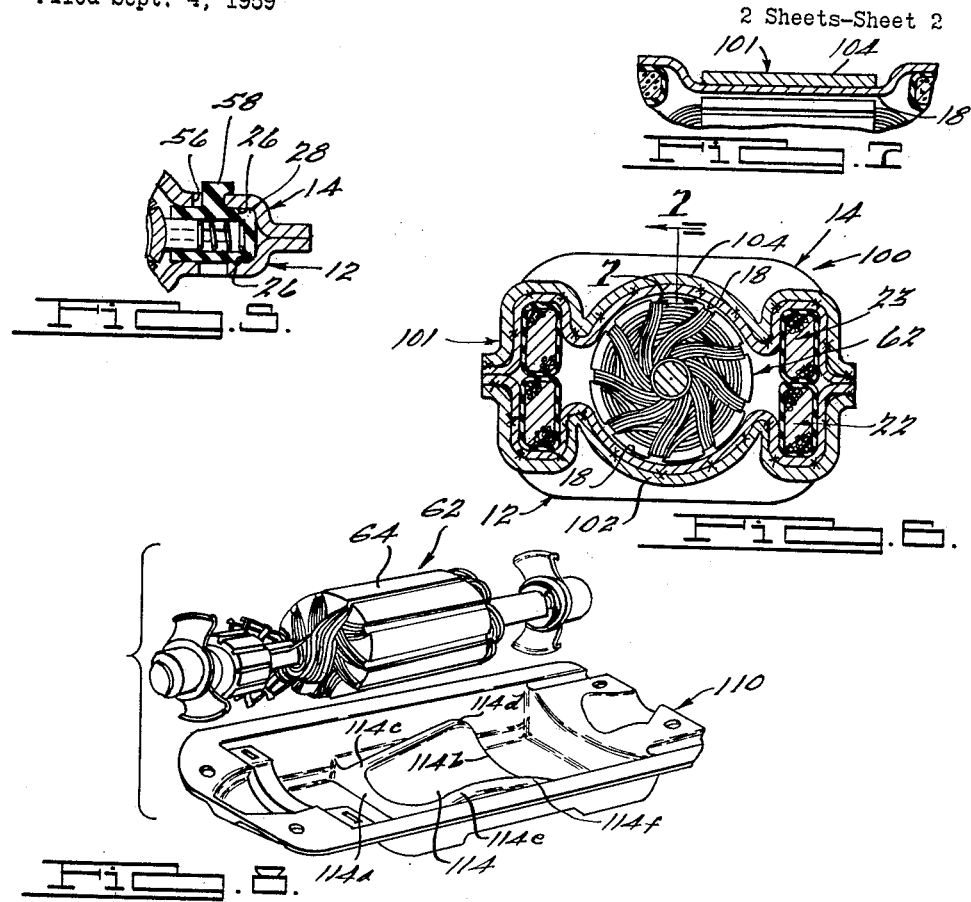
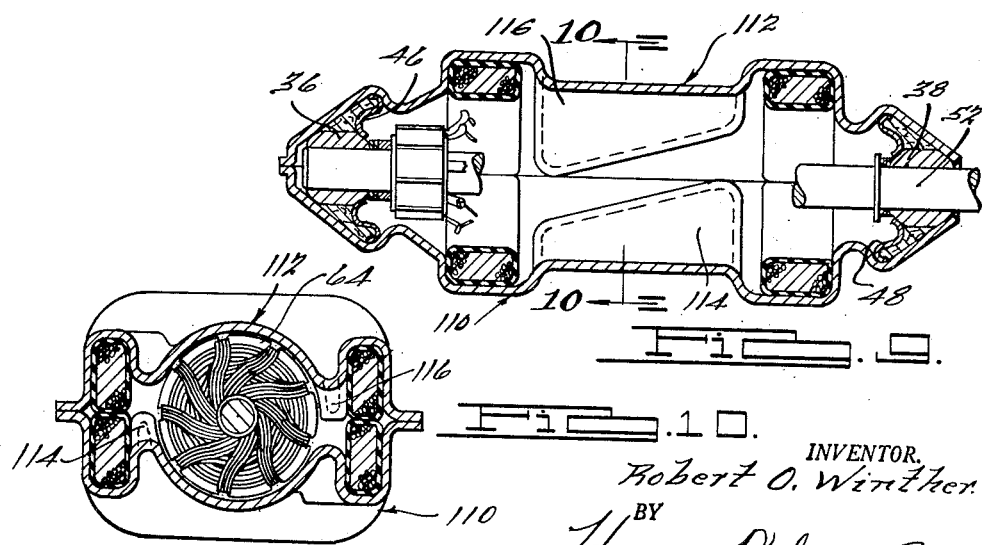
INVENTOR.
Robert O. Winther
BY
Harness, Dickey & Pierce
ATTORNEYS.

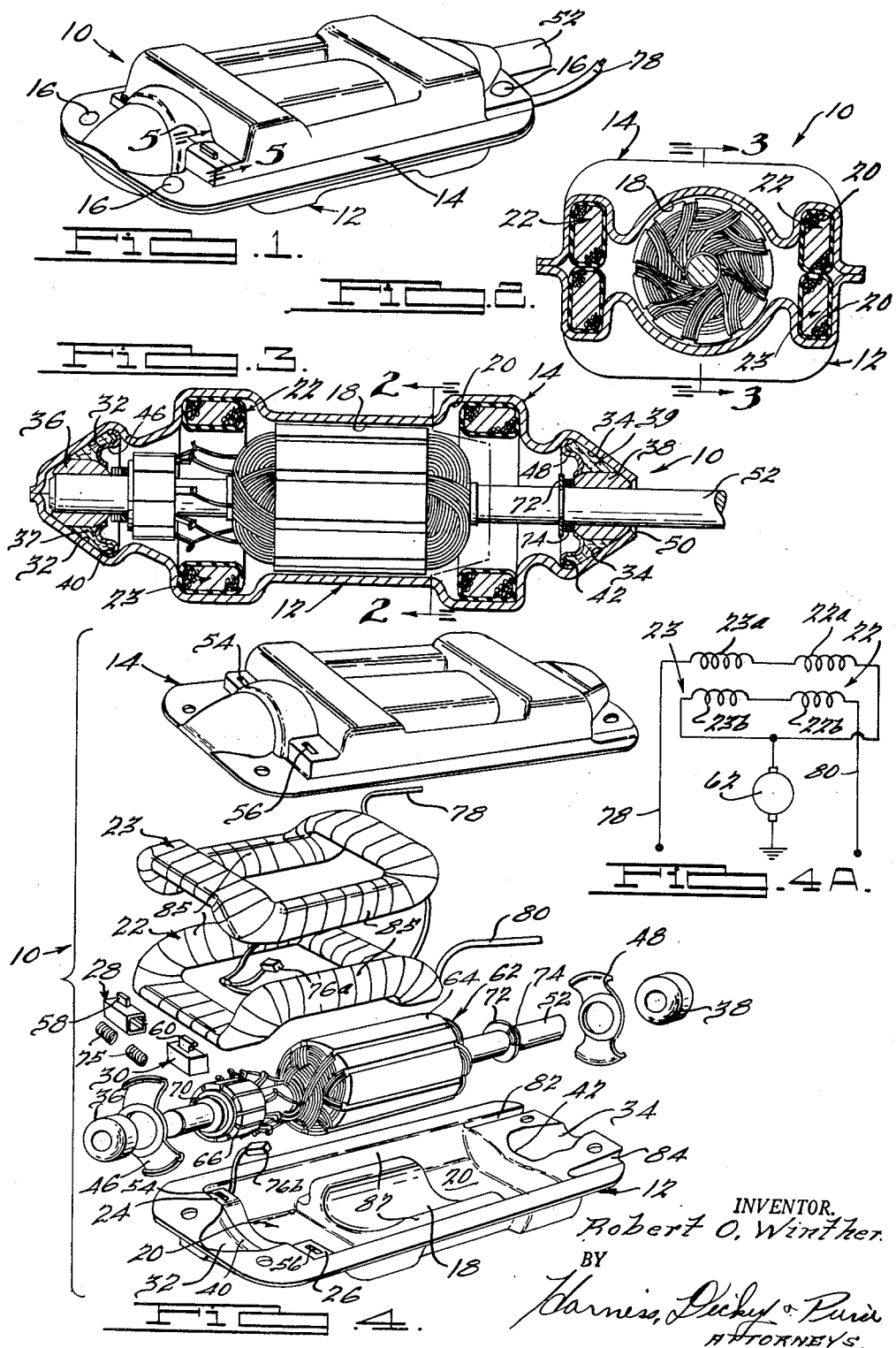

United States Patent Office 3,156,838
Patented Nov. 10, 1964

3,156,838
DIRECT CURRENT ELECTRIC MOTOR
Robert O. Winther, Menominee, Mich., assignor to King-Seeley Thermos Co., a corporation of Michigan
Filed Sept. 4, 1959, Ser. No. 838,350
7 Claims. (Cl. 310—42)

This invention relates to an improved electric motor construction, and more particularly, but not necessarily exclusively, to an improved construction for relatively small D.C. motors of the type commonly referred to as fractional horsepower motors.

One important object of the present invention is to provide an improved direct current electric motor of simplified and inexpensive, yet rugged and dependable construction.

Other objects of the invention are: to provide an improved electric motor construction in which the field pole pieces are formed as integral parts of the housing, and the housing itself forms the low reluctance portion of the field flux path; to provide an improved D.C. motor construction of the stated character having a housing made of two halves of identical form, which are shaped to receive the other parts of the motor and to retain them in position without the use of separate fasteners, other than the fasteners required to secure the housing stampings together, thereby facilitating assembly and reducing both assembly and material costs; to provide an improved motor of this character in which the housing halves define conical chambers for receiving and positioning spherical bearings for the motor shaft, and in which the bearings are resiliently urged into seating engagement in the conical chambers; to provide an improved motor construction of this type including leaf spirngs arranged to be engaged by sloping wall portions of the housing as the two halves of the housing are moved into their assembly confronting position, thereby to urge the bearings into their seats; to provide such a construction embodying an improved brush supporting arrangement; to provide such a construction in which the poles are skewed; to provide an improved D.C. motor construction which may be readily adapted for use at various different power ratings at minimum cost; to provide a motor of this character which may be used at an increased power output rating by the addition of a magnetic girdle exteriorly of the housing, whereby the same housing may be used for motors of different power ratings; and in general to provide an improved electric motor construction which is simple and inexpensive to assemble, and rugged and dependable in service.

The foregoing and other objects and advantages of the invention will become apparent from the following detailed description of representative embodiments thereof, taken in conjunction with the drawings, wherein:

FIGURE 1 is a perspective view of an electric motor according to a first embodiment of the invention;

FIG. 2 is a cross-sectional view of the motor shown in FIG. 1, the view being taken along the section line 2—2 of FIG. 3;

FIG. 3 is a longitudinal sectional view taken along the section line 3—3 of FIG. 2;

FIG. 4 is an exploded perspective view of the motor shown in the preceding figures, illustrating the assembly thereof;

FIG. 4A is a diagrammatic showing of illustrative armature and field connections;

FIG. 5 is a fragmentary cross-sectional view taken along the line 5—5 of FIG. 1;

FIG. 6 is a cross-sectional view of a first modified form of motor construction according to the invention;

FIG. 7 is a fragmentary longitudinal section taken along the line 7—7 of FIG. 6;

FIG. 8 is an exploded view of a portion of a second modified form of motor construction according to the invention, only one of the two housing halves being shown in this view;

FIG. 9 is a longitudinal sectional view of a motor according to the embodiment illustrated in FIG. 8; and FIG. 10 is a cross-sectional view taken along the line 10—10 of FIG. 9.

An electric motor 10 according to a first embodiment of the invention as shown in FIGS. 1–5 includes two identical housing halves 12 and 14 which generically, may be formed of any material which forms a low reluctance path for the field flux. For example, sintered materials may be used. Preferably and as illustrated, members 12 and 14 are sheet metal stampings and are secured together along their edges by rivets 16 or by any other desired fastening means such as by welding. The housing halves 12 and 14 are identical to each other in construction, being unitary sheet metal stampings made of a magnetic material such as soft steel and formed to receive and cagingly retain the other parts of the motor. Since the housing halves 12 and 14 are identical to each other, assembly of the motor is facilitated, inventory problems are reduced, production costs are minimized, and only one die set is required for manufacturing the housing halves for a motor of any one size.

Each one of the housing halves 12 and 14 is shaped to form a cylindrically curved, inwardly concave recess 18 defining a field pole face. A generally rectangular recess 20 surrounds the pole face 18 and is shaped for receiving one of the field coils 22 and 23, which are wound in a rectangular shape to fit around the pole faces 18. Each housing half 12 and 14 is stepped at one end of the rectangular recess 20 to provide a pair of supporting shoulders 24 and 26 for the brush holders 28 and 30 on opposite respective sides of the motor axis. Detent means are provided for securing the brush holders 28 and 30 in position on the shoulders 24 and 26. As shown, the detent means include slots 54 and 56 extending through the housing wall and opening on the shoulders 28 and 30, respectively, and tabs 58 and 60, which are fixed to the brush holders and project into the slots 54 and 56 of one of the housing halves 12 and 14 when the motor is assembled.

The ends of the housing halves 12 and 14 are formed to provide conically curved recesses 32 and 34, respectively, for receiving spherical bearings 36 and 38. At the inner ends of the conical recesses 32 and 34 there are sloping wall portions 40 and 42 for engaging the outer ends of bearing retaining springs 46 and 48, which urge the bearings 36 and 38 into seating engagement in the conical recesses 32 and 34, respectively.

The bearings 36 and 38 may be made of sintered powdered metal to provide a desired degree of porosity for oil retention, and for manufacturing convenience in molding them only their end portions (not separately designated) are spherically curved. Oil saturated felt packing rings 37 and 39 may be placed around the bearings 36 and 38 to insure an adequate supply of oil for a prolonged period, and to absorb additional oil when the motor is serviced.

As illustrated, the motor 10 is of the single ended type. One end of the housing is shaped to form an opening 50 through which the motor shaft 52 extends, and the opposite end of the housing is closed. It will be understood that if desired a double-ended arrangement may be provided with the motor shaft 52 extended to project from both ends of the housing.

The motor 10 is assembled as illustrated in FIG. 4 by first placing one housing half 12 upon a support (not shown) then placing the various internal parts of the motor in position upon the housing half 12, and thereafter securing the second housing half 14 in confronting relationship upon the first housing half 12. The coils 22 and 23 are placed in position first with the lower one 22 resting in the rectangular recess 20 of the lower housing half 12. The upper coil 23 is then swung aside to permit insertion of the armature asembly 62, which includes the armature 64 (which may be conventional), the shaft 52, the commutator 66, the spherical bearings 36 and 38, and the bearing-retaining springs 46 and 48. The armature assembly also includes spacers, or shims 70 mounted on the shaft 52 between the commutator 66 and the left-hand spherical bearing 36 for minimizing end play in the commutator direction, and a snap ring 72, together with spacers or shims 73 at the opposite end of the shaft 52 for minimizing end play in the opposite direction.

The armature assembly 62 is placed in position with the spherical bearings 36 and 38 resting in the conical recesses 32 and 34 of the lower housing half 12, and with the bearing-retaining springs 46 and 48 oriented vertically as viewed in FIG. 4, with the lower tips of the springs resting against the sloping surfaces 40 and 42. The brush springs 75 and the brushes 76 are inserted into the brush holders 28 and 30 which are then placed on the shoulders 24 and 26, respectively, with the retaining tabs 58 and 60 projecting through the slots 54 and 56, respectively.

For purposes of clarity in the drawing, the tabs 58 and 60 are shown in FIG. 4 as projecting upwardly, but in the assembly the brush holders would be reversed and inverted so that the retaining tabs 58 and 60 project downwardly into the slots 54 and 56 of the housing half 12 to retain the brush holders properly in position during the final assembly steps.

The upper coil 23 is then swung down upon the lower coil 22, and the leads 78 and 80 are laid in their respective grooves 82 and 84, which extend from the rectangular recess 20 outwardly to the ends of the housing half 12. The upper housing half 14 is then placed upon the lower housing half 12 and secured thereto as by the rivets 16.

During the application of the second half 14, the upper ends of the leaf-type bearing springs 46 and 48 are engaged by the sloping surfaces 40 and 42 of the upper housing half 14, while their lower ends bear against the corresponding shoulders 40 and 42 in the lower housing half 12. As the upper housing half is brought down into engagement with the lower housing half, the shoulders 40 and 42 load the springs 46 and 48, urging them outwardly with a camming action to drive the spherical bearings 36 and 38 firmly into seated engagement in the conical recesses 32 and 34.

The field coils 22 and 23 are preferably wound, as shown, in a generally rectangular shape, with their longitudinally extending legs 85 turned inwardly towards the median plane of the motor. This shape permits the longitudinally extending portions 87 of the rectangular recesses 20 to be narrower and shallower than otherwise, thus minimizing the over-all size of the motor, reducing the depth of draw required in stamping the housing halves 12 and 14, and maximizing the magnetic flux produced by the coils in the desired region between the field pole faces 18. In addition, the longitudinally extending legs 85 of the opposing coils 22 and 23 abut each other and support the coils against inward movement out of the recesses 20.

The armature and field windings may be variously connected to the source of power. Preferably and as illustrated, field windings 22 and 23 are bifilar, each comprising two separate coils insulated from each other. An illustrative diagram of connections is shown in FIG. 4A, in which corresponding coils 22a and 23a of each winding are connected in series with each other and with the armature 62. The same is true of coils 22b and 23b. Thus, one set of coils serves for one direction of operation and the other set serves for the other direction of rotation, depending upon whether power is applied between lead 78 and ground or between lead 80 and ground.

In this arrangement, brush 76a is connected to coils 23b and 22a and brush 76b is grounded through the motor housing. The bifilar arrangement is advantageous from several standpoints. For example, it reduces winding costs, produces maximum flux capacity, and improves heat capacity of the field windings since the inactive coils are available to absorb heat from the active coils.

The housing halves 12 and 14 may also be used in an electric motor 100 as illustrated in FIGS. 6 and 7 rated for a substantially greater power output than the motor 10 shown in FIGS. 1–5 merely by adding a girdle 101 of magnetic material around the housing halves 12 and 14 covering the wall portions thereof which form the low reluctance flux path for the field. As shown, the girdle 101 consists of two stampings 102 and 104 shaped to conform closely to the housing halves 12 and 14, respectively, and about equal in length to the field pole faces 18. The girdle 101 is made of a magnetic material such as soft steel and serves to decrease the reluctance of the field flux path relative to the reluctance provided by the housing halves 12 and 14 alone, thereby permitting the attainment of a stronger field.

This feature results in added manufacturing convenience since the housing halves 12 and 14 may be identical in motors of different power ratings, and the adaptation required for changing power ratings may be confined solely to the provision of the girdle 101, the two parts 102 and 104 of which may be welded, braced, or otherwise rigidly attached to the housing halves 12 and 14, respectively.

It is often desired to provide a skew relationship between the armature teeth of an electric motor and the field pole faces. Skewing of the armature teeth involves either an increase in size or a reduction in the power rating of the motor, since it results in a relative narrowing of the slots which receive the armature coils. In a modified construction according to the present invention, the field pole faces may be readily skewed without significantly reducing the motor power output, and without changing any of the other features of the motor, or increasing its cost of construction or assembly.

As illustrated in FIGS. 8–10, the housing halves 110 and 112 are shaped to define skewed field pole faces 114 and 116. Otherwise, the motor is exactly similar to the motor 10 illustrated in FIGS. 1–5. As before, the skewed pole faces 114 and 116 define a portion of a cylindrical surface spaced slightly outwardly from the surface of the armature 64. In this instance, however, considered as viewed from an end of the motor, corners 114d and 114f at one end of each pole are circumferentially displaced from the corresponding corners 114c and 114e at the other end of such pole. It is in this displaced sense that the term skewed is used herein. Preferably, the circumferential displacement from end-to-end of each field pole face is about one-half tooth width of the armature 64.

It is presently believed that the practice of the invention will find its most advantageous use in the production of relatively small electric motors of up to about $\frac{1}{10}$ horsepower continuous duty rating, or up to about one-half horsepower intermittent duty rating. For example, a motor rated at $\frac{1}{15}$ horsepower continuous duty according to the invention may have an over-all housing length of about 6 inches, a thickness of about $2\frac{11}{16}$ inches, and a width of about $4\frac{3}{16}$ inches. A typical $\frac{1}{40}$ horsepower motor according to the invention has an over-all housing length of $5\frac{3}{8}$ inches, a width of $2\frac{7}{8}$ inches, and a thickness of $1\frac{27}{32}$ inches. The provision of a girdle, such as the girdle 101 illustrated in FIG. 6, could be used further to increase the power ratings of these motors.

Although only several embodiments of the invention are specifically shown and described herein, it will be understood that the invention can be embodied in other and further specific forms, all within the spirit and scope of the appended claims.

What is claimed is:

1. An electric motor construction comprising a pair of housing portions made of a magnetic material and shaped to define a motor chamber when they are placed together in confronting relationship, means securing said housing portions together in confronting relationship and in register with each other, an armature assembly journaled in said chamber, and a pair of field coils disposed respectively in different ones of said portions and shaped to bear against each other to hold themselves against the walls of said chamber, each one of said housing portions being shaped to define a field pole face having a face spaced close to said armature assembly.

2. An electric motor construction comprising a pair of housing portions made of a magnetic material and shaped to define a motor chamber when they are placed together in confronting relationship, means securing said housing portions together in confronting relationship and in register with each other, the chamber defined by said housing portions having axially aligned conical end portions opening inwardly towards each other, inwardly sloping wall portions at the bases of said conical portions, spherically curved bearings seated in said conical end portions, and spring means engaged between said sloping wall portions and said bearings for urging said bearings into seated engagement in said conical end portions.

3. An electric motor construction comprising a pair of housing portions made of a magnetic material and shaped to define a motor chamber when they are placed together in confronting relationship, means securing said housing portions together in confronting relationship and in register with each other, the chamber defined by said housing portions having axially aligned conical end portions opening inwardly towards each other and outwardly facing sloping shoulders at the inner ends of said conical end portions, spherically curved bearings seated in said end portions, and springs engaging between said shoulders and said bearings for urging said bearings into seated engagement in said end portions, said shoulders being arranged to engage said springs in their unstressed positions during assembly of said housing portions and to stress said springs through a camming action as said housing portions are moved into their assembled position.

4. An electric motor construction comprising a pair of housing portions made of a magnetic material and shaped to define a motor chamber when they are placed together in confronting relationship, means securing said housing portions together in confronting relationship and in register with each other, an armature assembly journaled in said chamber, and a pair of field coils disposed respectively in different ones of said portions and shaped to bear against each other to hold themselves against the walls of said chamber, each one of said housing portions being shaped to define a curved field pole face spaced close to said armature assembly and skewed relative thereto so that it extends along a spiral path adjacent to the armature assembly.

5. An electric motor construction comprising a pair of housing portions made of a magnetic material and shaped to define a motor chamber when they are placed together in confronting relationship, means securing said housing portions together in confronting relationship and in register with each other, an armature assembly journaled in said chamber, a pair of brush holders cagingly retained within said chamber on opposite respective sides of said armature assembly, said housing portions having apertures adjacent to said brush holders, tabs fixed to said brush holders and projecting through said apertures for securing said brush holders in predetermined positions within said chamber, and a pair of field coils disposed respectively in different ones of said portions and shaped to bear against each other to hold themselves against the walls of said chamber, each one of said housing portions being shaped to define a field pole face having a surface spaced closed to said armature assembly.

6. A housing member for an electric motor comprising a tray-like stamping made of a magnetic material and shaped to define a motor chamber in conjunction with a second similar stamping when the two are secured together in registry and confronting relationship to each other, said stamping having when viewed from its concave side a central cylindrically curved recess, a rectangular recess surrounding said cylindrical recess and shaped to receive a motor field coil, a pair of depressed flat shoulder portions at one end of said rectangular recess for receiving and supporting a pair of brush holders, said shoulders having apertures therein for receiving projecting portions of the brush holders and thereby securing the brush holders against displacement toward said rectangular recess, and a pair of conically curved recesses at the opposite respective ends of said housing member having their apices pointing outwardly away from each other, said conical recesses being aligned with each other and being coaxially aligned with said central cylindrically curved recess.

7. A housing member for an electric motor comprising a tray-like stamping made of a magnetic sheet material and shaped to define a motor chamber in conjunction with a second similar stamping when the two are secured together in registry and confronting relationship to each other, said stamping having when viewed from its concave side a central cylindrically curved recess, a rectangular recess surrounding said cylindrical recess and shaped to receive a motor field coil, a pair of depressed flat shoulder portions at one end of said rectangular recess for receiving and supporting a pair of brush holders, said shoulders having apertures therein for receiving projecting portions of the brush holders and thereby securing the brush holders against displacement toward said rectangular recess, a pair of conically curved recesses at the opposite respective ends of said housing member having their apices pointing outwardly away from each other, said conical recesses being aligned with each other and being coaxially aligned with said central cylindrically curved recess, and a pair of outwardly facing annular shoulders at the inner ends of said conical recesses, said shoulders sloping in the opposite direction relative to said member from said conical recesses.

References Cited in the file of this patent

UNITED STATES PATENTS

| | | |
|---|---|---|
| 1,673,794 | Ayers | June 19, 1928 |
| 1,738,171 | Critchfield | Dec. 3, 1929 |
| 2,078,376 | Ford | Apr. 27, 1937 |
| 2,298,155 | Perkins | Oct. 6, 1942 |
| 2,504,564 | Merriam | Apr. 18, 1950 |
| 2,629,061 | Swaithout | Feb. 17, 1953 |